United States Patent

Ishii

Patent Number: 5,986,976
Date of Patent: Nov. 16, 1999

[54] MAGNETOOPTICAL RECORDING HEAD FOR A RECORDING APPARATUS INCLUDING A LAMINATED CORE HAVING A PLURALITY OF MAGNETIC THIN FILMS SANDWICHING INSULATING FILMS THEREBETWEEN

[75] Inventor: Kazuyoshi Ishii, Tokyo, Japan

[73] Assignee: Canon Kabushiki Kaisha, Tokyo, Japan

[21] Appl. No.: 08/603,191

[22] Filed: Feb. 20, 1996

Related U.S. Application Data

[63] Continuation of application No. 08/111,946, Aug. 26, 1993, abandoned.

[30] Foreign Application Priority Data

Aug. 28, 1992 [JP] Japan ................................ 4-251864
Aug. 10, 1993 [JP] Japan ................................ 5-216931

[51] Int. Cl.$^6$ .................................................. G11B 11/00
[52] U.S. Cl. .............................. 369/13; 360/59; 360/114
[58] Field of Search ......................... 369/12, 14, 275.2, 369/283, 288; 360/59, 114, 125, 126, 127; 365/122, 275.2, 283, 288; 428/335, 336, 692

[56] References Cited

U.S. PATENT DOCUMENTS

| | | | |
|---|---|---|---|
| 4,948,667 | 8/1990 | Mikami et al. | 428/336 |
| 5,027,334 | 6/1991 | Yamanaka et al. | 369/13 |

FOREIGN PATENT DOCUMENTS

| | | |
|---|---|---|
| 0281931 | 9/1988 | European Pat. Off. . |
| 0415721 | 3/1991 | European Pat. Off. . |
| 61-239412 | 10/1986 | Japan . |
| 63-007509 | 1/1988 | Japan . |
| 63-11101 | 9/1988 | Japan . |

OTHER PUBLICATIONS

Patent Abstracts of Japan, Kokai No. 63–211101, vol. 13, No. 001, Jan. 1989.
Patent Abstracts of Japan, Kokai No. 63–007509, vol. 12, No. 205, Jun. 1988.
Patent Abstracts of Japan, Kokai No. 03–086905, vol. 15, No. 266, Jul. 1991.
Patent Abstracts of Japan, Kokai No. 02–101609, vol. 14, No. 313, Jul. 1990.
Patent Abstracts of Japan, Kokai No. 59–119507, vol. 8, No. 245, Nov. 1984.

*Primary Examiner*—Ali Neyzari
*Attorney, Agent, or Firm*—Fitzpatrick, Cella, Harper & Scinto

[57] ABSTRACT

A magnetooptical recording magnetic head is provided with a base, a core, a coil wound on the core, and a driving device for driving the coil. The core provided on the base is formed by laminating a plurality of magnetic thin films with a high permeability and a high saturation magnetic flux density so as to sandwich insulating films therebetween.

60 Claims, 12 Drawing Sheets

MAGNETOOPTICAL RECORDING HEAD FOR A RECORDING APPARATUS INCLUDING A LAMINATED CORE HAVING A PLURALITY OF MAGNETIC THIN FILMS SANDWICHING INSULATING FILMS THEREBETWEEN

This application is a continuation, of application Ser. No. 08/111,946, filed Aug. 26, 1993, now abandoned.

BACKGROUND OF THE INVENTION

1. Field of the Invention

The present invention relates to a magnetooptical recording magnetic head and a magnetooptical recording apparatus for recording information signals in a magnetooptical recording medium in accordance with a magnetic field modulating scheme.

2. Related Background Art

A magnetooptical recording apparatus using a magnetic field modulating scheme is known as a magnetooptical recording apparatus for recording information in a magnetooptical recording medium, such as a magnetooptical disk, at a high density. In this scheme, laser light converged into a light spot about 1 μm in diameter is irradiated onto a recording medium, and a magnetic head applies a magnetic field modulated by an information signal onto a portion irradiated with the laser light, thereby recording the information signal.

Figure 1:
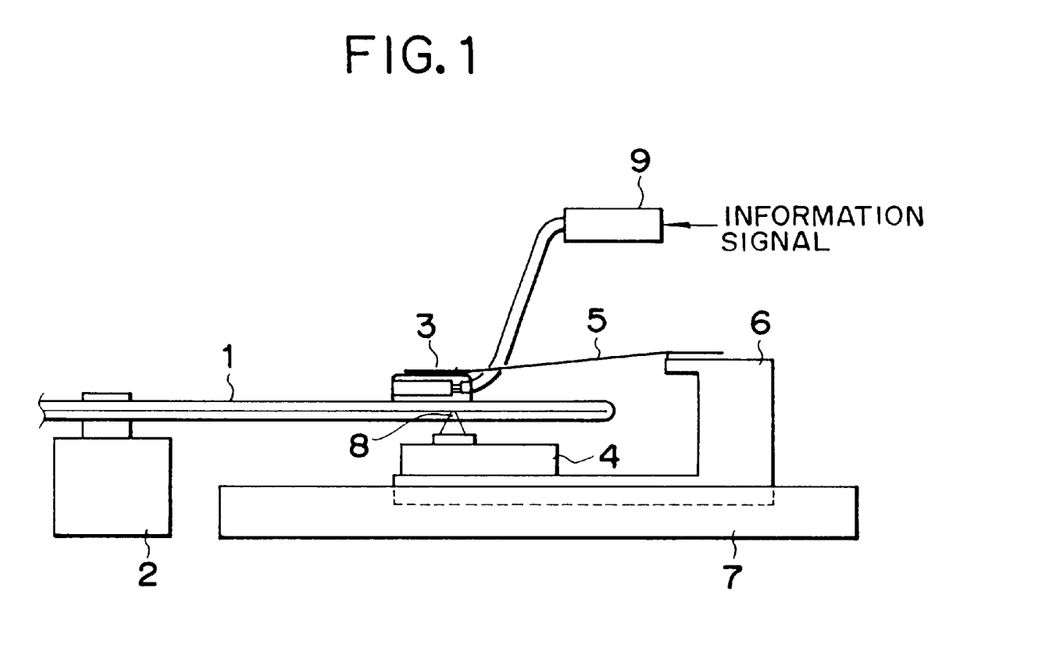
FIG. 1 is a schematic view showing the arrangement of a magnetooptical recording apparatus.

A generally known magnetooptical recording apparatus of the magnetic field modulating type has an arrangement as shown in FIG. 1. A magnetooptical recording medium 1 used in this apparatus is a disk-like medium manufactured by forming a signal recording layer on a transparent substrate. The disk 1 is rotated by a spindle motor 2. During this rotation, a floating magnetic head 3 is located on the upper surface side of the disk 1, and an optical head 4 is located on the lower surface side of the disk 1 at a position opposite to the floating magnetic head 3. The magnetic head 3 is held at the distal end of a suspension 5, and the fixed ends of the optical head 4 and the suspension 5 are connected to each other by a connecting member 6, thereby constituting a magnetooptical unit. The connecting member 6 is mounted on a linear motor 7. The optical head 4 and the magnetic head 3 are therefore driven by the linear motor 7 to together move in the radial direction of the disk 1.

To record an information signal on the disk 1 in the above magnetooptical recording apparatus of the magnetic field modulating type, the optical head 4 irradiates laser light 8 onto the signal recording layer of the disk 1 while the disk 1 is rotated at a high speed by the spindle motor 2, thereby forming an image of the laser light as a light spot about 1 μm in diameter on the signal recording layer. This consequently increases the temperature of the signal recording layer up to the Curie temperature or more. At the same time, the magnetic head 3 is driven by a magnetic head driving means 9 to apply a bias magnetic field modulated in accordance with the information signal to the portion whose temperature is raised. As a result, the direction of magnetization of the signal recording layer is pointed in the direction of the bias magnetic field to thereby record the information signal on the signal recording layer.

Figure 2A:
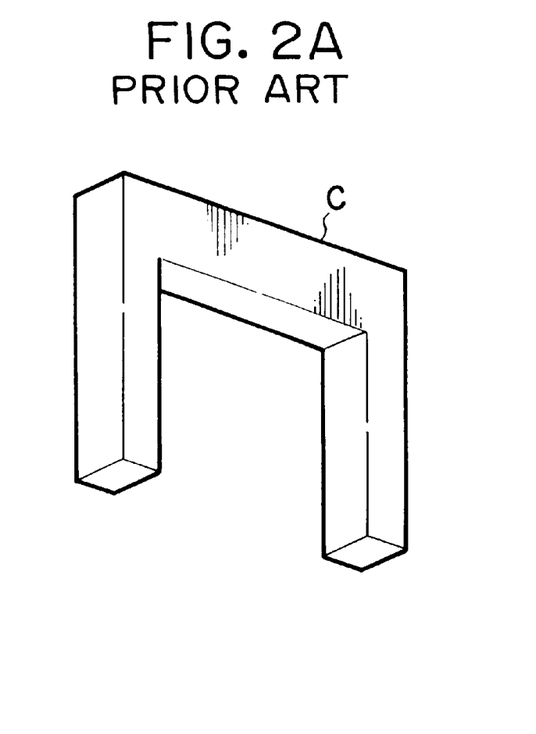
FIGS. 2A and 2B are views showing the arrangement of a conventional magnetooptical recording magnetic head.
Figure 2B:
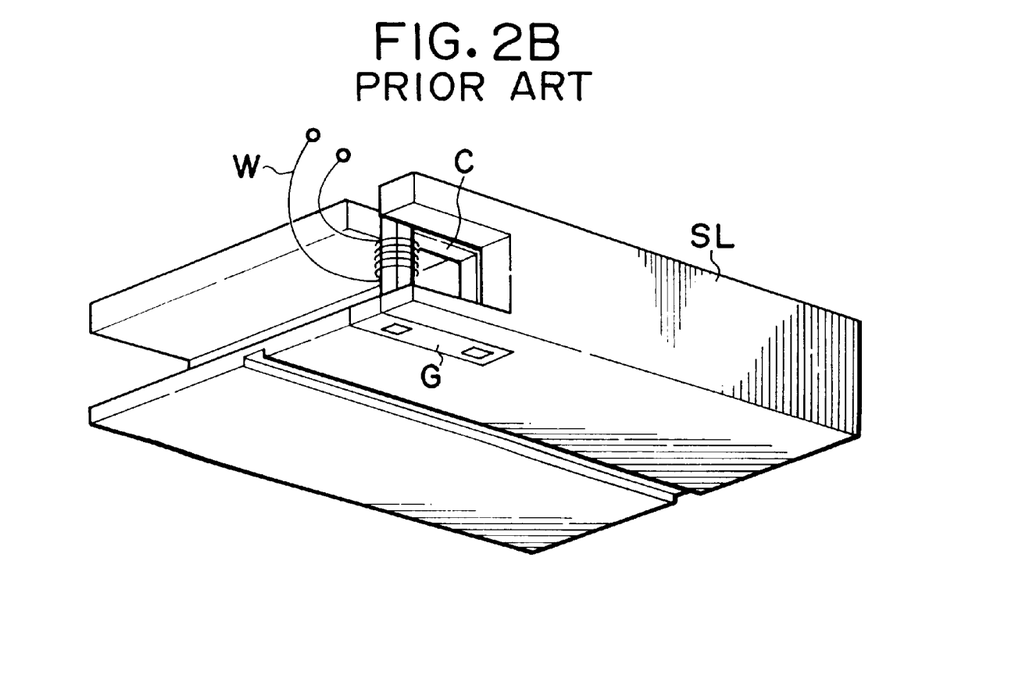

The arrangement of the magnetooptical recording magnetic head 3 used in the above magnetooptical recording apparatus is shown in FIGS. 2A and 2B. FIG. 2B is a perspective view showing the overall magnetic head, and FIG. 2A is an enlarged view showing a core of the magnetic head. This core C is generally made of ferrite with a high permeability. A coil W is wound around the main magnetic pole of the core C. The magnetic head moves while floating with a small gap kept with respect to the disk by means of an air stream produced by the high-speed rotation of the disk. The magnetic head, therefore, has a slider SL with an aerodynamic floating surface. The slider SL consists of a nonmagnetic material, such as ceramic. The core C and the slider SL are fused to each other via glass G.

Figure 3:
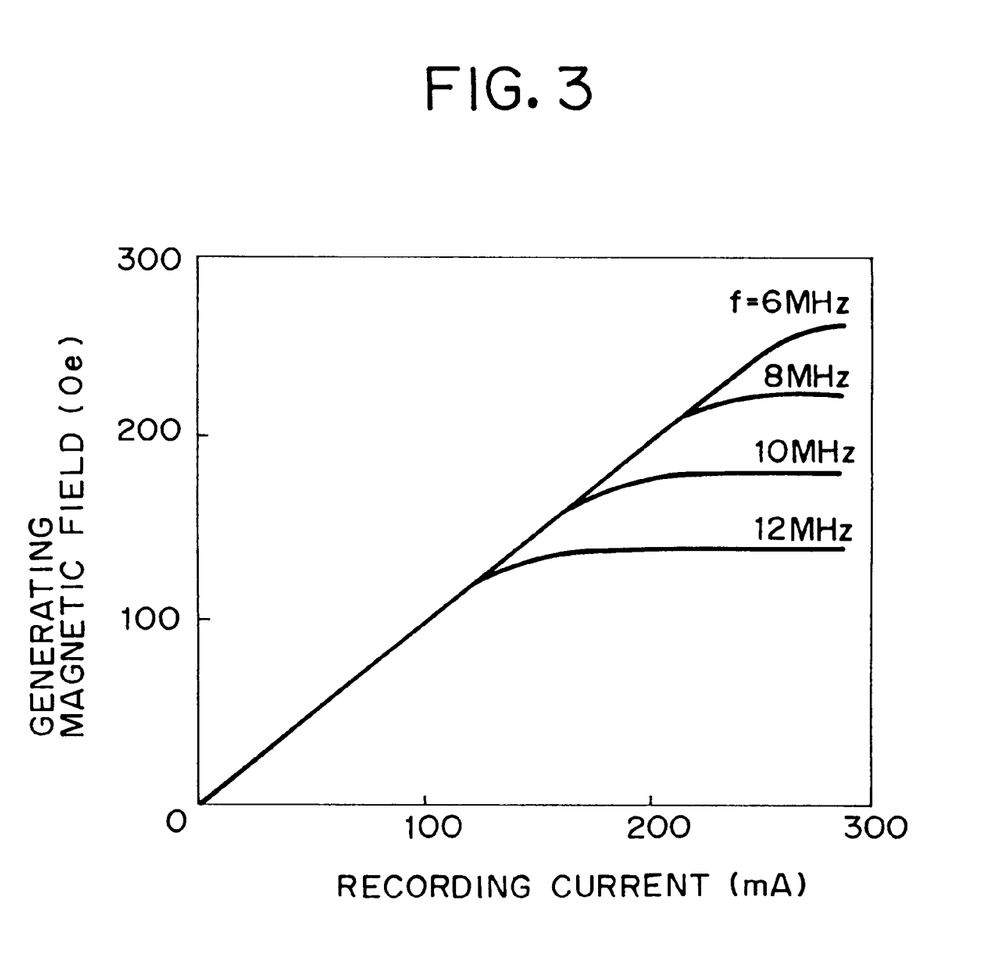
FIG. 3 is a graph showing the relationship between the recording current and the generating magnetic field in a conventional magnetooptical recording magnetic head.

FIG. 3 is a graph showing the relationship between the recording current flowing through a coil of a conventional magnetooptical recording magnetic head and the generating magnetic field of the magnetic head. FIG. 3 shows an example of conventional, standard magnetic heads in which a core consists of ferrite with a saturation magnetic flux density of 5 kG, the dimensions of a magnetic pole are 0.15 mm×0.15 mm, and the number of turns of a coil is 20. Generally, it is necessary to apply a bias magnetic field of 200 to 300 Oe in order to perform signal recording on a magnetooptical disk in a good condition. The graph shown in FIG. 3 demonstrates that the generating magnetic field is proportional to the recording current when the recording current is small, and is saturated with an increase in the recording current. This is so because the magnetic flux density inside the core cannot increase beyond the saturation magnetic flux density of ferrite.

Figure 4:
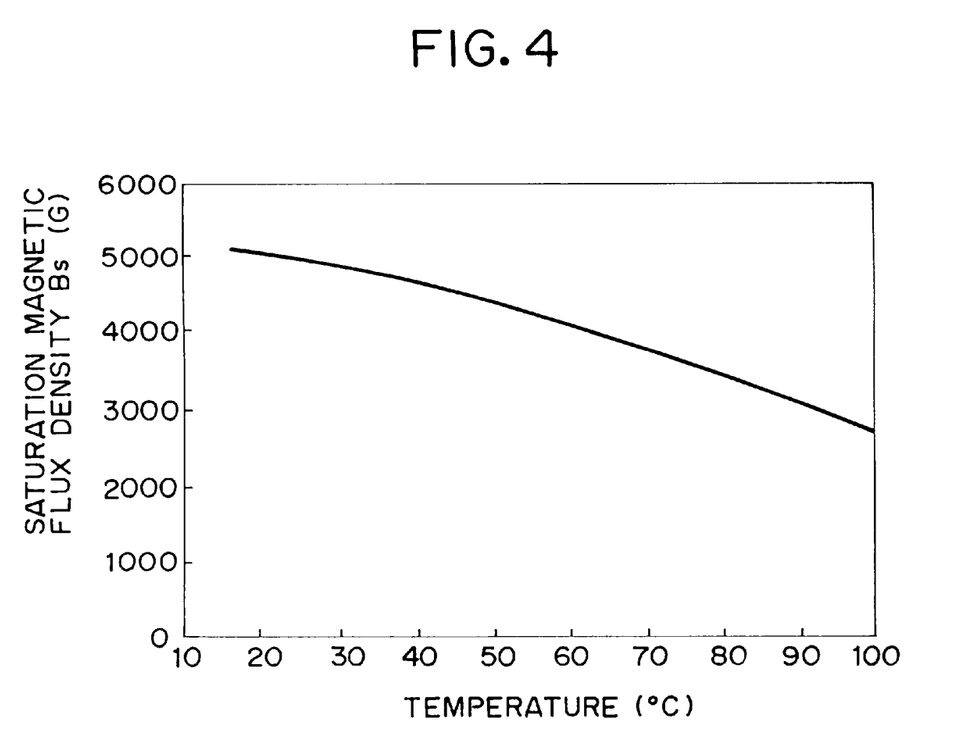
FIG. 4 is a graph showing the temperature characteristics of the saturation magnetic field density of a core of a conventional magnetooptical recording magnetic head.

In addition, the magnitude of the saturation magnetic field depends on the frequency f of the recording signal as shown in FIG. 3; the higher the frequency f, the lower the saturation magnetic field. Such a phenomenon is caused because a high-frequency loss (which is primarily a property inherent in the magnetic material forming the core) of the magnetic head increases to cause the magnetic head to generate heat as the frequency f of the recording signal rises, and the saturation magnetic flux density of ferrite forming the core decreases accordingly. As an example, FIG. 4 shows the temperature dependency of a saturation magnetic flux density Bs of ferrite used in a core of a conventional magnetooptical recording magnetic head. As shown in FIG. 4, although the saturation magnetic flux density Bs of ferrite is 5 kG at room temperature (25° C.), it decreases with an increase in temperature and becomes approximately 3 kG at 100° C.

A strong demand has recently arisen for higher-speed signal recording in such a magnetooptical recording apparatus, and so it becomes necessary to raise the frequency of a recording signal accordingly. If the frequency of a recording signal is raised as described above, however, the saturation magnetic field is lowered by an increase in the high-frequency loss of the magnetic head. For example, if the frequency of a recording signal is increased up to 10 MHz or more as shown in FIG. 3, it is impossible to obtain a generating magnetic field of 200 Oe or more which is required to perform signal recording in a good condition even at the maximum recording current. As described above, higher-speed signal recording is impossible because the frequency of a recording signal is limited by the performance of the magnetic head.

SUMMARY OF THE INVENTION

It is an object of the present invention to solve the problems of the above conventional magnetooptical recording magnetic heads and provide a magnetooptical recording magnetic head in which a core is constituted by laminating a plurality of magnetic thin films with a high permeability and a high saturation magnetic flux density with insulating films sandwiched between them.

The present invention is also characterized in that a plurality of thin films with a high permeability and a high saturation magnetic flux density are laminated with insulating films sandwiched between them to thereby form a laminated structure, and this laminated structure is sandwiched from both sides by substrates to form a core of a magnetooptical recording magnetic head.

These substrates are characterized by consisting of ferrite.

In addition, the present invention is characterized by improving the characteristics of a magnetic head by decreasing the thickness of each magnetic thin film to 10 $\mu$m or less.

Furthermore, the present invention is characterized in that the magnetic thin film consists of any of an Fe—Al—Si alloy (Sendust), an Fe—Ni alloy (permalloy), an Fe—(M) alloy, an FeNi—(M) alloy, an FeCo—(M) alloy, and a Co—(M) alloy (where (M) contains at least one type of an element selected from Si, B, C, P, N, Al, Mo, Ti, Zr, Nb, Hf, Ta, and Y).

Moreover, the present invention is characterized in that a plurality of magnetic thin films with a high permeability and a high saturation magnetic flux density are laminated with insulating films sandwiched between them on both sides of a substrate consisting of a magnetic material, thereby forming a core of a magnetooptical recording magnetic head.

The present invention is also characterized in that a core of a magnetooptical recording magnetic head is formed by bonding two or more substrates on at least one surface of each of which a plurality of magnetic thin films with a high permeability and a high saturation magnetic flux density are laminated with insulating films sandwiched between them.

The substrates are characterized by consisting of ferrite.

In addition, the present invention is characterized by improving the characteristics of the magnetic head by decreasing the thickness of each magnetic thin film to 10 $\mu$m or less.

Furthermore, the present invention is characterized in that the magnetic thin film consists of any of an Fe—Al—Si alloy (Sendust), an Fe—Ni alloy (permalloy), an Fe—(M) alloy, an FeNi—(M) alloy, an FeCo—(M) alloy, and a Co—(M) alloy (where (M) contains at least one type of an element selected from Si, B, C, P, N, Al, Mo, Ti, Zr, Nb, Hf, Ta, and Y).

DETAILED DESCRIPTION OF THE PREFERRED EMBODIMENTS

Figure 5A:
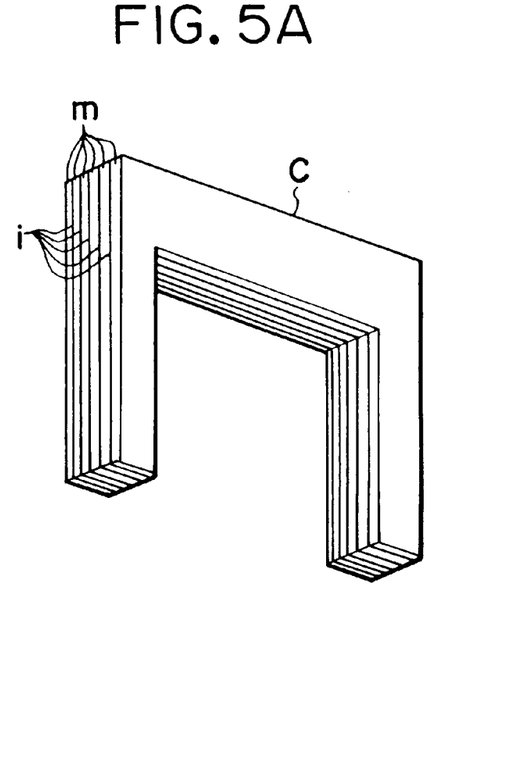
FIGS. 5A and 5B are views showing the arrangement of a magnetooptical recording magnetic head according to the present invention.
Figure 5B:
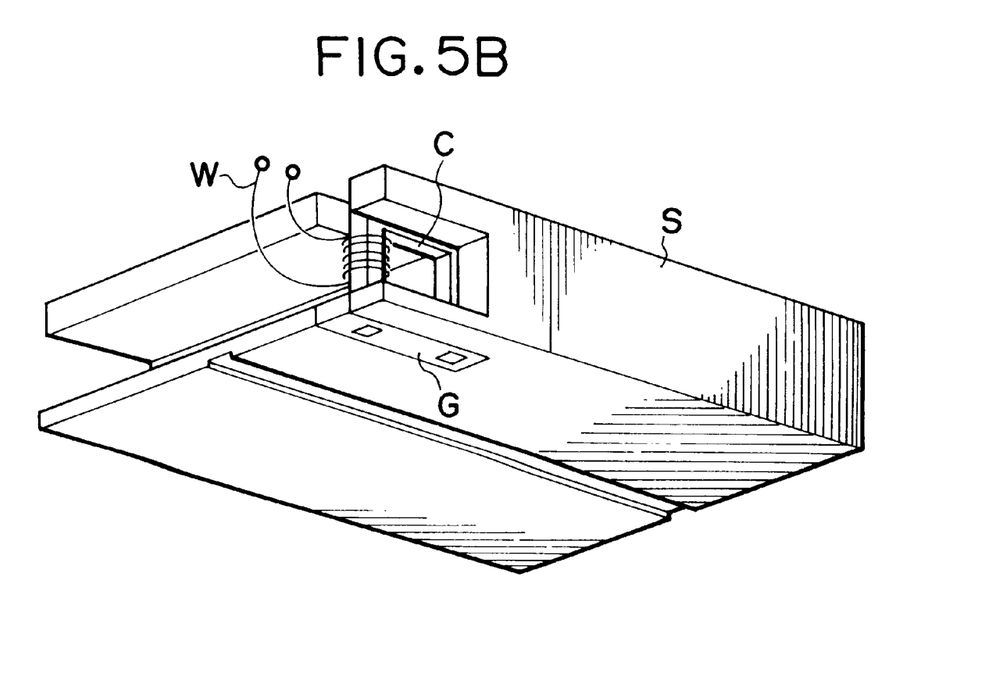

FIGS. 5A and 5B show an embodiment of a magnetooptical recording magnetic head according to the present invention. FIG. 5A is an enlarged view showing a core C, and FIG. 5B is a perspective view showing the overall magnetic head. Note that the same reference symbols as in the conventional example shown in FIGS. 2A and 2B denote the same parts in FIGS. 5A and 5B and a detailed description of the arrangements and the functions of these parts will be omitted. Note also that the magnetic head of the present invention shown in FIGS. 5A and 5B is used in the magnetooptical recording apparatus shown in FIG. 1. Referring to FIG. 5A, the core C is formed by laminating a plurality of magnetic thin films m with a high permeability and a high saturation magnetic flux density with insulating films i sandwiched between them. An example of the material of the magnetic thin films m is an Fe—Al—Si alloy (Sendust) with a saturation magnetic flux density of 7 to 11 kG. The insulating films i consist of $SiO_2$ or a resin material each having a sufficiently high electrical resistance. To prevent degradation in magnetic characteristics due to an eddy current generated in the core C when the core C is excited at a high frequency, it is preferable to decrease the thickness of each magnetic thin film m. A coil W is connected to the driving means 9 shown in FIG. 1.

Figure 6:
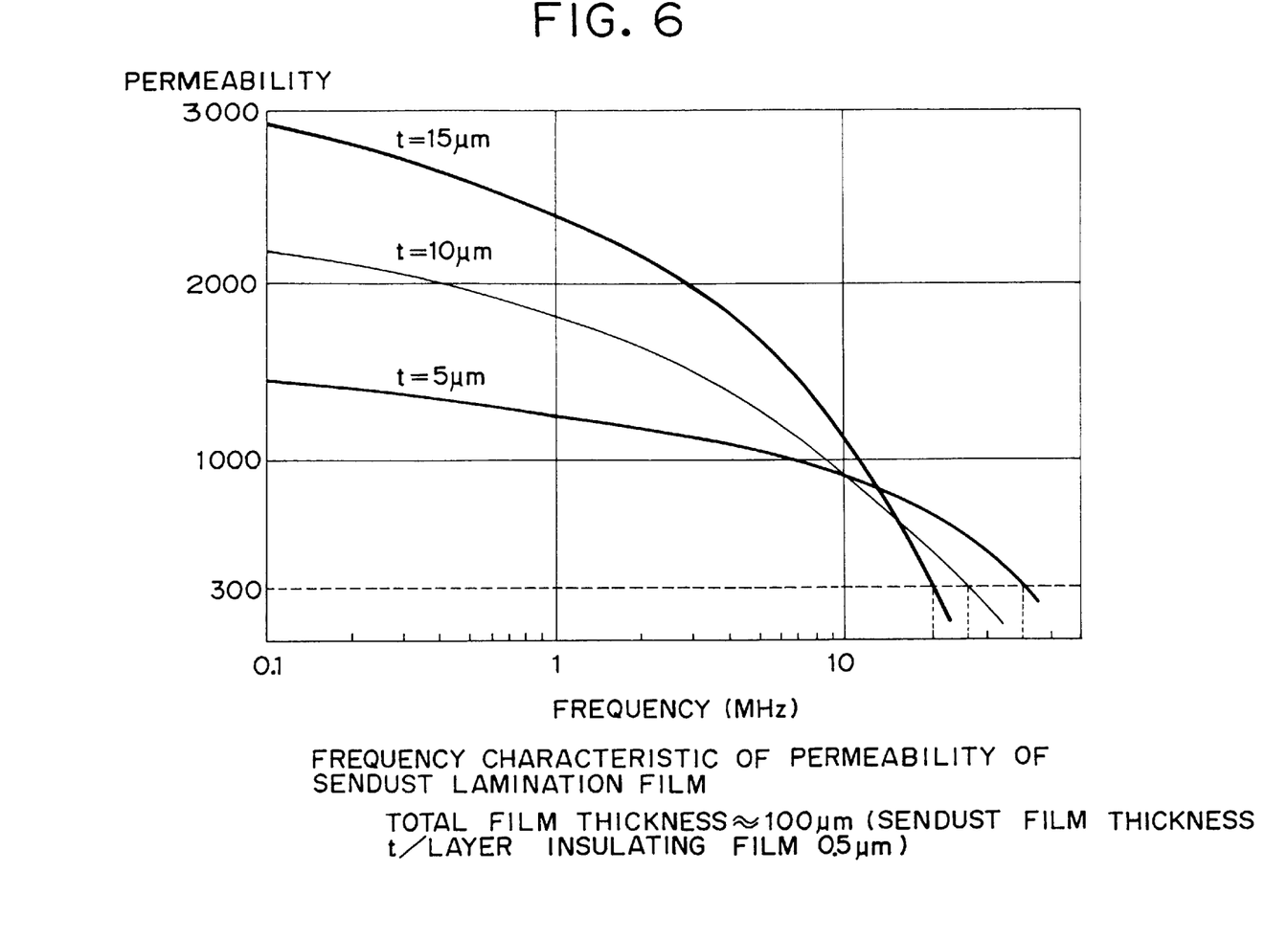
FIG. 6 is a graph showing the frequency characteristics of the permeability of a core of the magnetooptical recording magnetic head according to the present invention.

The thickness of the magnetic thin film m will be described with reference to FIG. 6. FIG. 6 is a graph showing the results obtained by actually measuring the frequency characteristics of the permeability of the core when film thicknesses t of the Sendust lamination film m are 5, 10, and 15 $\mu$m. The thickness of each insulating film i is 0.5 $\mu$m, and the total thickness of the insulating films i is 100 $\mu$m. The graph reveals that at frequencies lower than about 10 MHz, the permeability of the Sendust lamination film m tends to decrease as the film thickness t decreases. At frequencies higher than about 10 MHz, however, the permeability of the Sendust film increases as its film thickness decreases; that is, the frequency characteristic of the Sendust film extends to a high-frequency range. Generally, it is required to increase the permeability of the core to 300 or more in order to obtain satisfactory performance of the magnetooptical recording magnetic head as described above. In conventional cores consisting of ferrite, the upper limit of a frequency at which a permeability of 300 can be obtained is approximately 20 MHz. In the present invention, however, performance substantially equivalent to the above-mentioned performance can be obtained when Sendust film thickness t=15 $\mu$m. It is also confirmed that the frequency characteristics can be extended to a high-frequency range of about 25 MHz, when t=10 $\mu$m, and to a high-frequency range of about 40 MHz, when t=5 $\mu$m.

Recently, a demand has increasingly arisen for higher recording frequencies. When this demand is taken into account, it is required that the film thickness t of the Sendust lamination film m be a maximum of 15 $\mu$m and desirably 10

μm or less. Since the insulating films are normally nonmagnetic, most magnetic fluxes are concentrated to the magnetic thin films. For this reason, assuming that the saturation magnetic flux density of the magnetic thin film is 7 kG and the thickness of the insulating film is x % that of the magnetic thin film, an effective saturation magnetic flux density of the whole core is given by 7 kG×{100/(100+x)}. To obtain a saturation magnetic flux density higher than a saturation magnetic flux density of 4 to 6 kG of ferrite conventionally used in magnetic heads, the thickness of the insulating film need only be set at 16% or less than that of the magnetic thin film.

The thickness of the core C of the magnetooptical recording magnetic head is generally about 150 μm. Therefore, when the thickness of the magnetic thin film m is 5 μm and the thickness of the insulating film i is 0.5 μm, for example, the number of lamination films is about 27.

Figure 7:
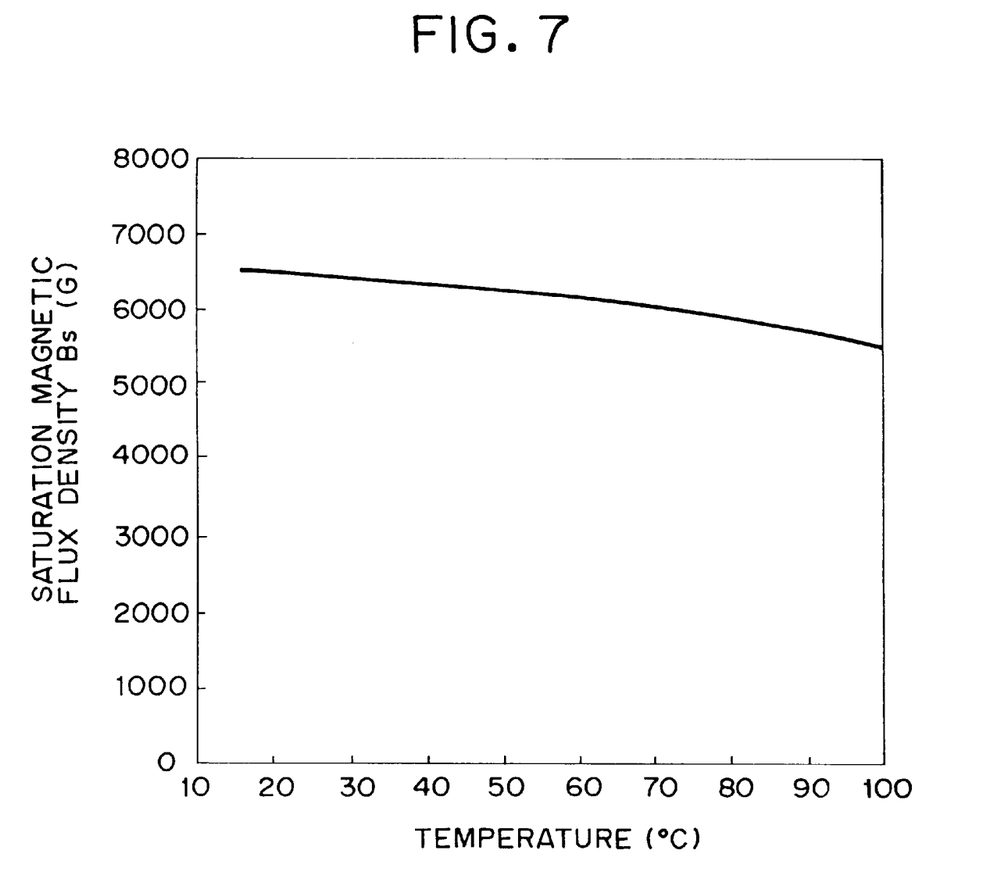
FIG. 7 is a graph showing the temperature characteristics of the saturation magnetic flux density of the core of the magnetooptical recording magnetic head according to the present invention.

FIG. 7 shows the temperature dependency of an effective saturation magnetic flux density Bs of the core consisting of the magnetic thin film made of the Fe—Al—Si alloy (Sendust) described above. As shown in FIG. 7, the effective saturation magnetic flux density Bs of the core formed by laminating the Fe—Al—Si magnetic thin films with the insulating films sandwiched between them is about 6.4 kG at room temperature (25° C.). Although the effective saturation magnetic flux density Bs decreases as the temperature rises, the decreasing ratio is smaller than that of ferrite shown in FIG. 4; the saturation magnetic flux density Bs is as high as 5.5 kG even at 100° C.

Figure 8:
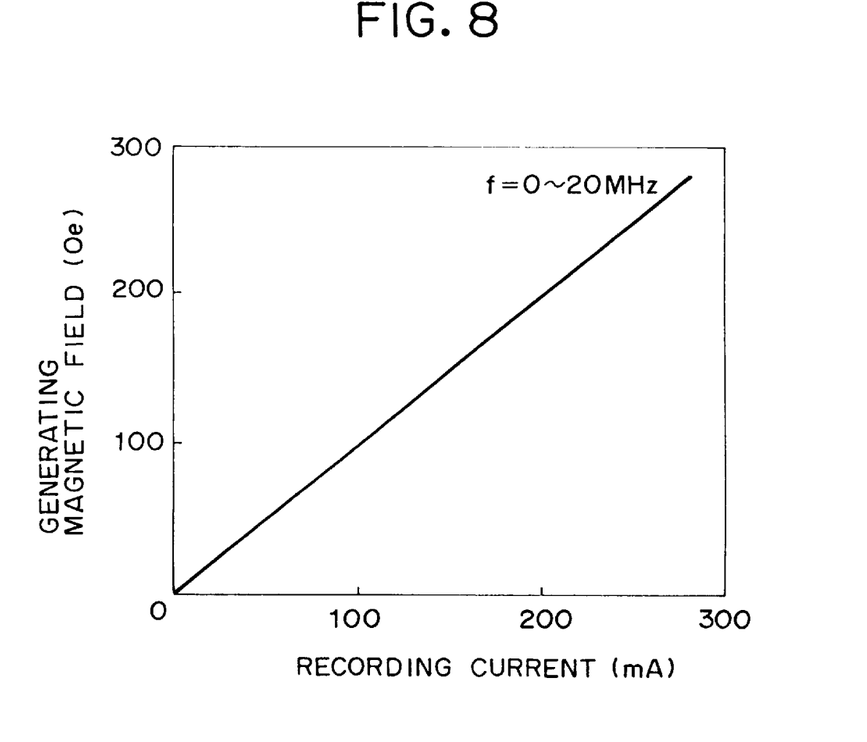
FIG. 8 is a graph showing the relationship between the recording current and the generating magnetic field in the magnetooptical recording magnetic head according to the present invention.

The reason why the Fe—Al—Si alloy exhibits the temperature dependency different from that of ferrite is that the Curie temperature of the Fe—Al—Si alloy is 400 to 500° C., higher than a Cume temperature of ferrite of 150 to 250° C. FIG. 8 shows the relationship between the recording current and the generating magnetic field intensity of the magnetic head of this embodiment. As is apparent from FIG. 8, even if the frequency of a recording signal is 10 to 20 MHz, a generating magnetic field of 200 Oe or more which is required for good signal recording can be obtained because the generating magnetic field is not saturated at 300 Oe or less.

This characteristic of a high saturation magnetic flux density and a high Curie temperature is inherent not only in the Fe—Al—Si alloy (Sendust) but also in other magnetic materials, such as an Fe—Ni alloy (permalloy), an Fe—(M) alloy, an FeNi—(M) alloy, an FeCo—(M) alloy, and a Co—(M) alloy (where (M) contains at least one type of an element selected from Si, B, C, P, N, Al, Mo, Ti, Zr, Nb, Hf, Ta, and Y), so the core may be made of these materials.

The core as described above is manufactured by laminating and bonding a plurality of magnetic thin films (metal foils) formed into a desired shape with resin layers as insulating layers sandwiched between them. Alternatively, as disclosed in Japanese Laid-Open Patent Application No. 61-239412, the core may be manufactured by cutting a core material, which is formed by laminating a plurality of magnetic thin films via a resin, into a predetermined shape by using an energy beam, such as laser light. Such methods facilitate the manufacture and can provide high yields.

The core need not entirely consist of a laminated structure of the magnetic thin films as in the above embodiment. For example, in an embodiment shown in FIG. 9, a laminated structure of magnetic thin films m and insulating films i is sandwiched from both sides by substrates P1 and P2 each consisting of relatively thick ferrite (e.g., 50 μm), thereby forming a core. This embodiment can naturally achieve the same effect as in the above embodiment. In addition, since the laminated structure is sandwiched between the ferrite substrates P1 and P2, the mechanical strength of the structure is increased, and this effectively prevents damage to the core in post-processing and assembling steps. The material of the substrates for sandwiching the laminated structure need not be ferrite but may be ceramic as a nonmagnetic material.

In such a structure, the magnetic thin films and the insulating films may be formed on the substrates by using a thin film formation technique, such as a sputtering film formation process.

Figure 9:
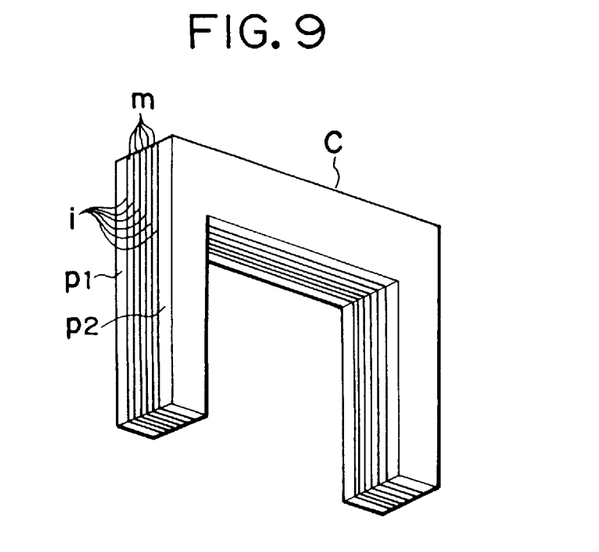
FIG. 9 is a perspective view showing another embodiment of a core.

For example, the embodiment shown in FIG. 9 is manufactured by first forming a laminated structure in which the magnetic thin films and the insulating films are formed alternately on the substrate P1 consisting of ferrite as a magnetic material through the sputtering film formation process, bonding the resulting laminated structure to the ferrite substrate P2 to form a core material, and forming the core material into a predetermined shape.

Figure 10:
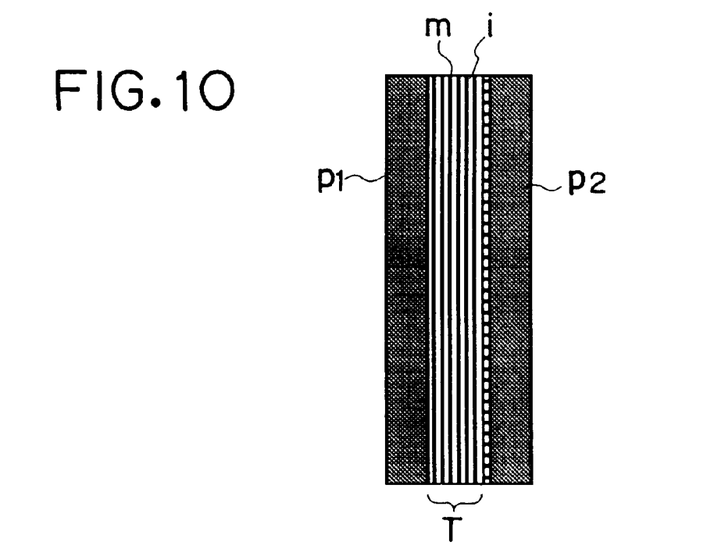
FIGS. 10 to 16 are views showing the embodiments of the arrangements of core materials of the magnetooptical recording magnetic head according to the present invention.

FIG. 10 is a sectional view showing such a core material, in which a dotted line indicates the bonded surfaces. Referring to FIG. 10, a laminated structure T is constituted by magnetic thin films m and insulating films i.

Figure 11:
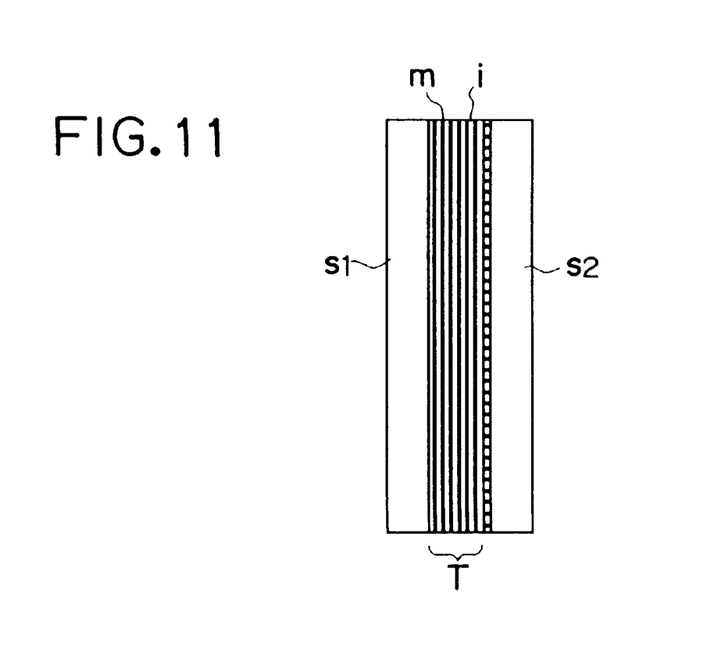

FIG. 11 shows an embodiment using substrates Si and S2 consisting of ceramic as a nonmagnetic material, instead of the ferrite substrates P1 and P2 shown in FIG. 10.

The sputtering film formation process can form a magnetic thin film with a thickness of 10 μm or less easily and is therefore very effective in extending the high-frequency characteristics of permeability.

Forming the laminated structure T 100 to 150 μm in thickness in order to form a magnetic path with a predetermined thickness through the sputtering film formation process prolongs a time required for the manufacture because the number of times of thin film formation is large, and also brings about frequent occurrence of film formation failure owing to a stress acting on the films. It is therefore desired that the thickness of the laminated structure T be 100 μm or less.

When a magnetic material, such as ferrite, is used for the substrates as in the embodiment shown in FIG. 10, since the ferrite substrates themselves form a magnetic path, the thickness of the laminated structure T required to form a magnetic path with a predetermined thickness can be decreased by the amount of the magnetic path formed by the substrates. This can effectively shorten the manufacturing time and prevent film formation failure. When a 150-μm thick magnetic path is to be formed, for example, the thickness of the laminated structure T can be decreased to 50 μm by using two ferrite substrates P1 and P2 each having a thickness of 50 μm.

In this structure, a portion of the magnetic path consists of ferrite with a low saturation magnetic flux density and a low Curie temperature, but it is still possible to obtain a satisfactory effect by sufficiently increasing the saturation magnetic flux density and the Curie temperature of the laminated structure constituted by the magnetic thin films.

Figure 12:
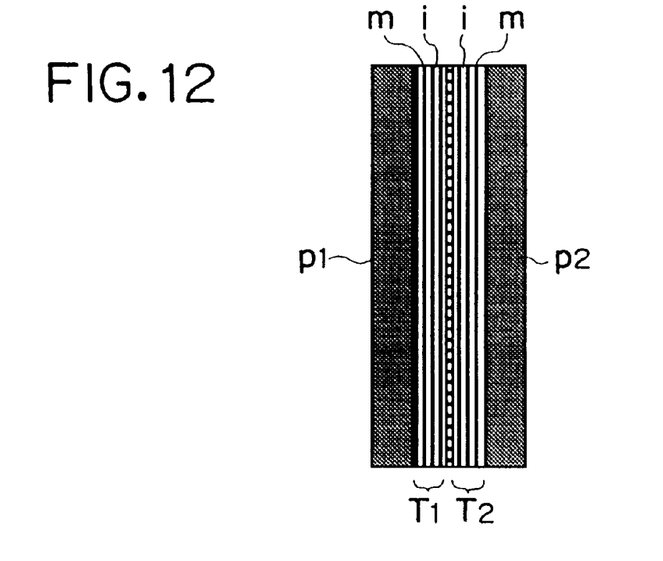

FIG. 12 shows another embodiment of a core material manufactured by forming laminated structures T1 and T2 each constituted by magnetic thin films m and insulating films i on ferrite substrates P1 and P2, respectively, through the sputtering film formation process, and bonding the surfaces of the ferrite substrates P1 and P2 on which the laminated structures T1 and T2 are formed.

Figure 13:
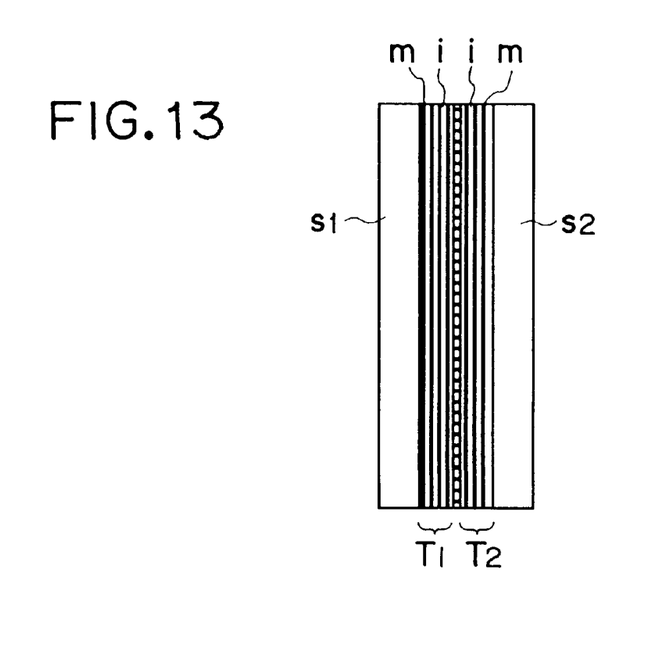

FIG. 13 shows still another embodiment of a core material using substrates S1 and S2 consisting of ceramic as a nonmagnetic material, instead of ferrite.

In each embodiment, the laminated structures T1 and T2 each constituted by the magnetic thin films m and the insulating films i are formed on the two substrates S1 and S2, respectively. This makes it possible to further decrease the thickness of each laminated structure required for formation of a magnetic path with a predetermined thickness, thereby effectively shortening the manufacturing time and preventing film formation failure.

Figure 14:
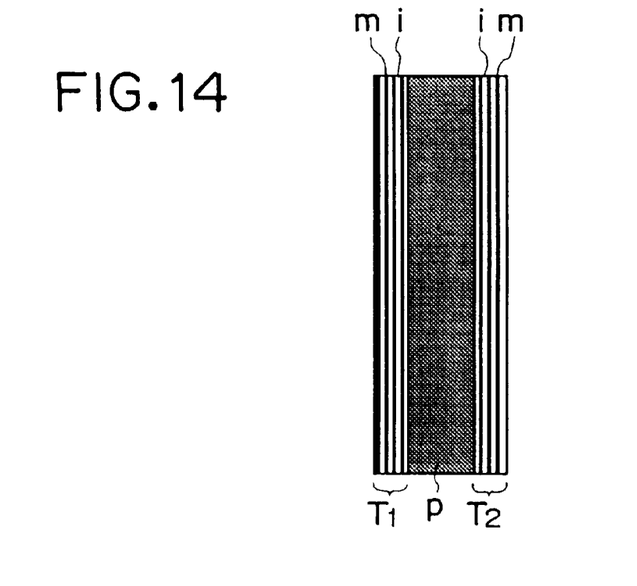

Other embodiments will be described below. In the embodiment shown in FIG. 14, laminated structures T1 and T2 each constituted by magnetic thin films m and insulating films i are formed on both surfaces of a ferrite substrate P through the sputtering film formation process, thereby manufacturing a core material.

Figure 15:
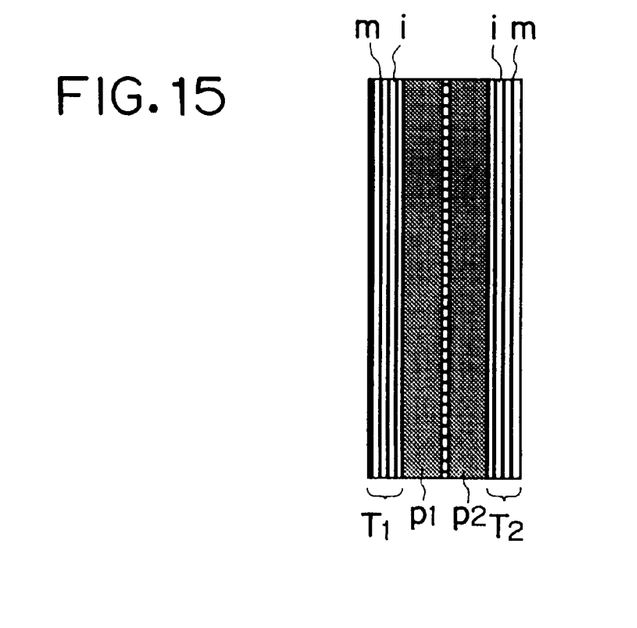

In the embodiment shown in FIG. 15, a core material is manufactured by forming laminated structures T1 and T2 each constituted by magnetic thin films m and insulating films i on ferrite substrates P1 and P2, respectively, through the sputtering film formation process, and bonding the surfaces of the substrates P1 and P2, on which the laminated structures T1 and T2 are not formed.

Figure 16:
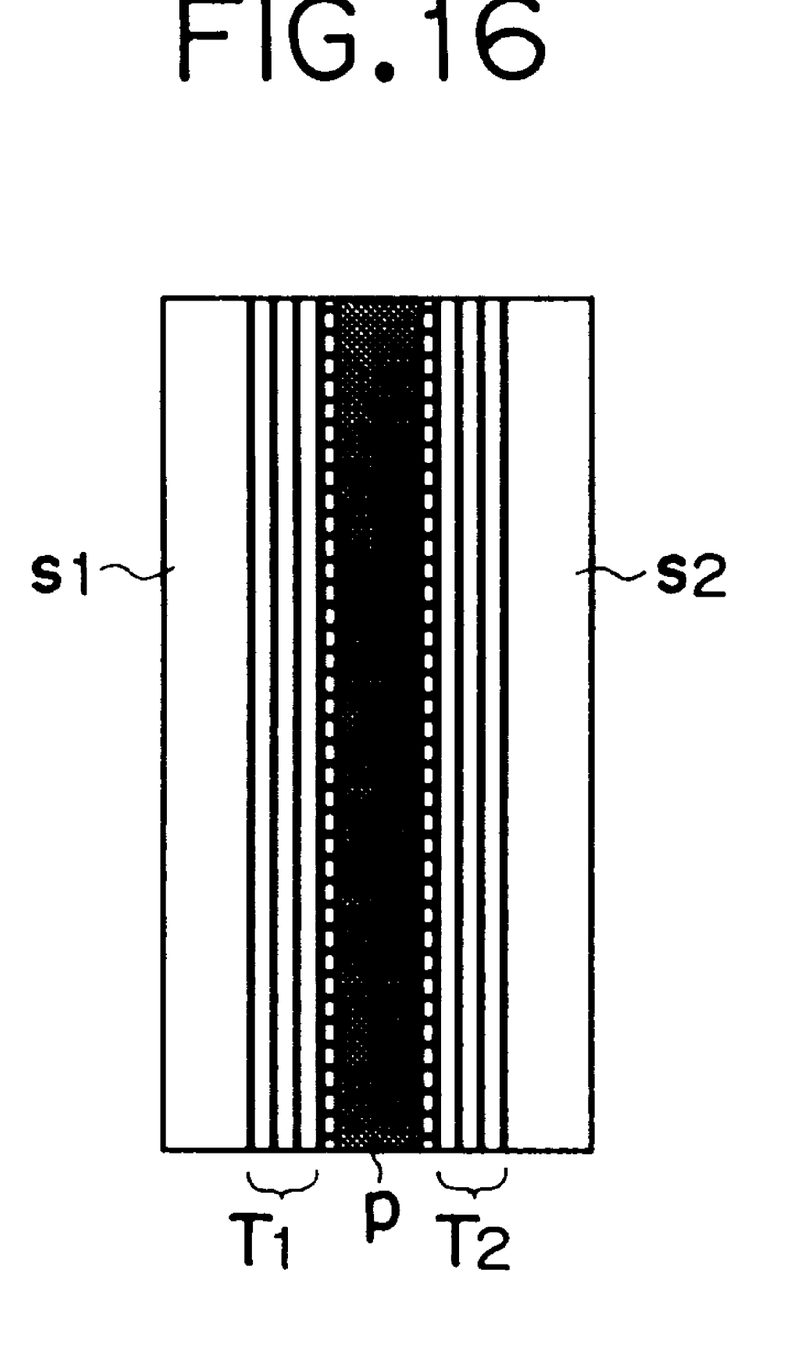

In the embodiment shown in FIG. 16, laminated structures T1 and T2 each constituted by magnetic thin films m and insulating films i are formed on substrates S1 and S2, respectively, consisting of ceramic as a nonmagnetic material, through the sputtering film formation process. The surfaces of the substrates S1 and S2 on which the laminated structures T1 and T2 are formed are then bonded to both surfaces of a ferrite substrate P to sandwich the substrate P between them, thereby manufacturing a core material.

In the above embodiments, when the substrates consist of ferrite or when the core material is constituted by a plurality of laminated structures, the thickness of each individual laminated structure can be decreased to be smaller than the predetermined thickness of a magnetic path. As described above, therefore, this provides the effect of shortening the manufacturing time and preventing film formation failure.

In addition, the core of the magnetooptical recording magnetic head according to the present invention is not limited to the U-shaped core demonstrated in each embodiment but may be an E-shaped core, a bar-like core, or a core in which a gap is formed in part of a magnetic path.

When the substrates are to be formed by using ferrite, the use of Mn-Zn ferrite is most preferred. When the substrates are to be formed by using a nonmagnetic material, it is preferred to use ceramic, such as $CaO$—$TiO_2$, $NiO$—$CaO$—$TiO_2$, $NiO$—$MgO$—$TiO_2$, and $MnO$—$NiO$, or crystallized glass. To prevent film formation failure resulting from a stress acting when laminated structures are formed on these substrates through the sputtering film formation process, it is desired that the thermal expansion coefficient of the substrate material be in agreement with that of the magnetic thin film. For example, the thermal expansion coefficient is approximately $100 \times 10^{-7}$ to $150 \times 10^{-7}/°$ C.

Furthermore, the magnetic head is not limited to the air-floating type magnetic head but may be a magnetic head of a type which slides on the surface of a magnetooptical recording medium or a magnetic head of a type in which the distance between itself and a magnetooptical recording medium is controlled by an actuator. The magnetooptical recording medium is also not limited to a disk-like medium but may be a sheet-like or tape-like medium.

As has been described above, the magnetooptical recording magnetic head according to the present invention is characterized by forming a core by laminating a plurality of magnetic thin films with a high permeability and a high saturation magnetic flux density with insulating films sandwiched between them. This magnetic head can generate a magnetic field of 200 Oe or more, which is required to perform signal recording in a good condition, even when the frequency of a recording signal is 10 MHz or more. The magnetic head can therefore meet a recent requirement for high-speed signal recording.

What is claimed is:

1. A core for a magnetooptical recording magnetic head, said core comprising:
   a first substrate;
   a first lamination member formed on the first substrate by laminating a plurality of magnetic thin films with a high permeability and a high saturation magnetic flux density with insulating films sandwiched therebetween;
   a second substrate; and
   a second lamination member formed on the second substrate by laminating a plurality of magnetic thin films with a high permeability and a high saturation magnetic flux density with insulating films sandwiched therebetween,
   wherein a surface of said first lamination member is adhered to a surface of said second lamination member, the thickness of each of said magnetic thin films is at most 10 $\mu$m and the thickness of each of said first and second lamination members is at most 100 $\mu$m.

2. A core according to claim 1, wherein said magnetic thin films comprise at least one alloy selected from the group consisting of an Fe—Al—Si alloy (Sendust), an Fe—Ni alloy (permalloy), an Fe—(M) alloy, an Fe—Ni—(M) alloy, an FeCo—(M) alloy and a Co—(M) alloy, (M) containing at least one element selected from the group consisting of Si, B, C, P, N, Al, Mo, Ti, Zr, Nb, Hf, Ta and Y.

3. A core according to claim 1, wherein each of said first and second substrates comprises a magnetic material.

4. A core according to claim 3, wherein said magnetic material is a ferrite.

5. A core according to claim 1, wherein each of said first and second substrates comprises a non-magnetic material.

6. A core according to claim 5, wherein said non-magnetic material is a ceramic.

7. A magnetooptical recording magnetic head comprising:
   a base;
   a core provided on said base, said core comprising a first substrate, a first lamination member formed on the first substrate by laminating a plurality of magnetic thin films with a high permeability and a high saturation magnetic flux density with insulating films sandwiched therebetween, a second substrate and a second lamination member formed on the second substrate by laminating a plurality of magnetic thin films with a high permeability and a high saturation magnetic flux density with insulating films sandwiched therebetween, a surface of said first lamination member being adhered to a surface of said second lamination member, the thickness of each of said magnetic thin films being at most 10 $\mu$m and the thickness of each of said first and second lamination members being at most 100 $\mu$m; and
   a coil wound around said core.

8. A magnetooptical recording magnetic head according to claim 7, wherein said magnetic thin films comprise at least one alloy selected from the group consisting of an Fe—Al—Si alloy (Sendust), an Fe—Ni alloy (permalloy), an Fe—(M) alloy, an Fe—Ni—(M) alloy, an FeCo—(M) alloy and a Co—(M) alloy, (M) containing at least one element selected from the group consisting of Si, B, C, P, N, Al, Mo, Ti, Zr, Nb, Hf, Ta and Y.

9. A magnetooptical recording magnetic head according to claim 7, wherein each of said first and second substrates comprise a magnetic material.

10. A magnetooptical recording magnetic head according to claim 9, wherein said magnetic material is a ferrite.

11. A magnetooptical recording magnetic head according to claim 7, wherein each of said first and second substrates comprises a non-magnetic material.

12. A magnetooptical recording magnetic head according to claim 11, wherein said non-magnetic material is a ceramic.

13. A magnetooptical recording apparatus comprising:

an optical head for irradiating a magnetooptical recording medium, said magnetic head comprising a base, a core provided on said base, and a coil wound around said core, wherein said core comprises a first substrate, a first lamination member formed on the first substrate by laminating a plurality of magnetic thin films with a high permeability and a high saturation magnetic flux density with insulating films sandwiched therebetween, a second substrate and a second lamination member formed on the second substrate by laminating a plurality of magnetic thin films with a high permeability and a high saturation magnetic flux density with insulating films sandwiched therebetween, a surface of said first lamination member being adhered to a surface of said second lamination member, the thickness of each of said magnetic thin films being at most 10 $\mu$m and the thickness of each of said first and second lamination members being at most 100 $\mu$m.

14. A magnetooptical recording apparatus according to claim 13, wherein said magnetic thin films comprise at least one alloy selected from the group consisting of an Fe—Al—Si alloy (Sendust), an Fe—Ni alloy (permalloy), an Fe—(M) alloy, an Fe—Ni—(M) alloy, an FeCo—(M) alloy and a Co—(M) alloy, (M) containing at least one element selected from the group consisting of Si, B, C, P, N, Al, Mo, Ti, Zr, Nb, Hf, Ta and Y.

15. A magnetooptical recording apparatus according to claim 13, wherein each of said first and second substrates comprises a magnetic material.

16. A magnetooptical recording apparatus according to claim 15, wherein said magnetic material is a ferrite.

17. A magnetooptical recording apparatus according to claim 13, wherein each of said first and second substrates comprises a non-magnetic material.

18. A magnetooptical recording apparatus according to claim 17, wherein said non-magnetic material is a ceramic.

19. A core for a magnetooptical recording magnetic head, said core comprising:

a first substrate;

a first lamination member formed on the first substrate by laminating a plurality of magnetic thin films with a high permeability and a high saturation magnetic flux density with insulating films sandwiched therebetween;

a second substrate; and a second lamination member formed on the second substrate by laminating a plurality of magnetic thin films with a high permeability and a high saturation magnetic flux density with insulating films sandwiched therebetween, wherein a surface of said first substrate on which said first lamination member is not formed is adhered to a surface of said second substrate on which said second lamination member is not formed, the thickness of each of said magnetic thin films is at most 10 $\mu$m and the thickness of each of said first and second lamination members is at most 100 $\mu$m.

20. A core according to claim 19, wherein said magnetic thin films comprise at least one alloy selected from the group consisting of an Fe—Al—Si alloy (Sendust), an Fe—Ni alloy (permalloy), an Fe—(M) alloy, an Fe—Ni—(M) alloy, an FeCo—(M) alloy and a Co—(M) alloy, (M) containing at least one element selected from the group consisting of Si, B, C, P, N, Al, Mo, Ti, Zr, Nb, Hf, Ta and Y.

21. A core according to claim 19, wherein each of said first and second substrates comprises a magnetic material.

22. A core according to claim 21, wherein said magnetic material is a ferrite.

23. A magnetooptical recording magnetic head comprising:

a base;

a core provided on said base, said core comprising a first substrate, a first lamination member formed on the first substrate by laminating a plurality of magnetic thin films with a high permeability and a high saturation magnetic flux density with insulating films sandwiched therebetween, a second substrate and a second lamination member formed on the second substrate by laminating a plurality of magnetic thin films with a high permeability and a high saturation magnetic flux density with insulating films sandwiched therebetween, a surface of said first substrate on which said first lamination member is not formed being adhered to a surface of said second substrate on which said second lamination member is not formed, the thickness of each of said magnetic thin films being at most 10 $\mu$m and the thickness of each of said first and second lamination members being at most 100 $\mu$m; and a coil wound around said core.

24. A magnetooptical recording magnetic head according to claim 23, wherein said magnetic thin films comprise at least one alloy selected from the group consisting of an Fe—Al—Si alloy (Sendust), an Fe—Ni alloy (permalloy), an Fe—(M) alloy, an Fe—Ni—(M) alloy, an FeCo—(M) alloy and a Co—(M) alloy, (M) containing at least one element selected from the group consisting of Si, B, C, P, N, Al, Mo, Ti, Zr, Nb, Hf, Ta and Y.

25. A magnetooptical recording magnetic head according to claim 23, wherein each of said first and second substrates comprises a magnetic material.

26. A magnetooptical recording magnetic head according to claim 25, wherein said magnetic material is a ferrite.

27. A magnetooptical recording apparatus comprising:

an optical head for irradiating a magnetooptical recording medium with a light beam; and a magnetic head for applying a magnetic field to the magnetooptical recording medium, said magnetic head comprising a base, a core provided on said base, and a coil wound around said core, wherein said core comprises a first substrate, a first lamination member formed on the first substrate by laminating a plurality of magnetic thin films with a high permeability and a high saturation magnetic flux density with insulating films sandwiched therebetween, a second substrate and a second lamination member formed on the second substrate by laminating a plurality of magnetic thin films with a high permeability and a high saturation magnetic flux density with insulating films sandwiched therebetween, and wherein a surface of said first substrate on which said first lamination member is not formed is adhered to a surface of said second substrate on which said second lamination member is not formed, and the thickness of each of said magnetic thin films being at most 10 μm and the thickness of each of said first and second lamination members being at most 100 μm.

28. A magnetooptical recording apparatus according to claim 27, wherein said magnetic thin films comprise at least one alloy selected from the group consisting of an Fe—Al—Si alloy (Sendust), an Fe—Ni alloy (permalloy), an Fe—(M) alloy, an Fe—Ni—(M) alloy, an FeCo—(M) alloy and a Co—(M) alloy, (M) containing at least one element selected from the group consisting of Si, B, C, P, N, Al, Mo, Ti, Zr, Nb, Hf, Ta and Y.

29. A magnetooptical recording apparatus according to claim 27, wherein each of said first and second substrates comprises a magnetic material.

30. A magnetooptical recording apparatus according to claim 29, wherein said magnetic material is a ferrite.

31. A core for a magnetooptical recording magnetic head, said core comprising:
    a substrate;
    a first lamination member formed on a surface of said substrate by laminating a plurality of magnetic thin films with a high permeability and a high saturation magnetic flux density with insulating films sandwiched therebetween; and
    a second lamination member formed on an opposite surface of said substrate by laminating a plurality of magnetic thin films with a high permeability and a high saturation magnetic flux density with insulating films sandwiched therebetween,
    wherein the thickness of each of said magnetic thin films is at most 10 μm and the thickness of each of said first and second lamination members is at most 100 μm.

32. A core according to claim 31, wherein said magnetic thin films comprise at least one alloy selected from the group consisting of an Fe—Al—Si alloy (Sendust), an Fe—Ni alloy (permalloy), and Fe—(M) alloy, an Fe—Ni—(M) alloy, an FeCo—(M) alloy and a Co—(M) alloy, (M) containing at least one element selected from the group consisting of Si, B, C, P, N, Al, Mo, Ti, Zr, Nb, Hf, Ta and Y.

33. A core according to claim 31, wherein said substrate comprises a magnetic material.

34. A core according to claim 33, wherein said magnetic material is a ferrite.

35. A magnetooptical recording magnetic head comprising:
    a base;
    a core provided on said base, said core comprising a substrate, a first lamination member formed on a surface of said substrate by laminating a plurality of magnetic thin films with a high permeability and a high saturation magnetic flux density with insulating films sandwiched therebetween, and a second lamination member formed on an opposite surface of said substrate by laminating a plurality of magnetic thin films with a high permeability and a high saturation magnetic flux density with insulating films sandwiched therebetween, the thickness of each of said magnetic thin films being at most 10 μm and the thickness of each of said first and second lamination members being at most 100 μm; and
    a coil wound around said core.

36. A magnetooptical recording magnetic head according to claim 35, wherein said magnetic thin films comprise at least one alloy selected from the group consisting of an Fe—Al—Si alloy (Sendust), an Fe—Ni alloy (permalloy), and Fe—(M) alloy, an Fe—Ni—(M) alloy, an FeCo—(M) alloy and a Co—(M) alloy, (M) containing at least one element selected from the group consisting of Si, B, C, P, N, Al, Mo, Ti, Zr, Nb, Hf, Ta nd Y.

37. A magnetooptical recording magnetic head according to claim 35, wherein said substrate comprises a magnetic material.

38. A magnetooptical recording magnetic head according to claim 37, wherein said magnetic material is a ferrite.

39. A magnetooptical recording apparatus comprising:
    an optical head for irradiating a magnetooptical recording medium, said magnetic head comprising a base, a core provided on said base, and a coil wound around said core,
    wherein said core comprises a substrate, a first lamination member formed on a surface of said substrate by laminating a plurality of magnetic thin films with a high permeability and a high saturation magnetic flux density with insulating films sandwiched therebetween, and a second lamination member formed on an opposite surface of said substrate by laminating a plurality of magnetic thin films with a high permeability and a high saturation magnetic flux density with insulating films sandwiched therebetween, the thickness of each of said magnetic thin films being at most 10 μm and the thickness of each of said first and second lamination members being at most 100 μm.

40. A magnetooptical recording apparatus according to claim 39, wherein said magnetic thin films comprise at least one alloy selected from the group consisting of an Fe—Al—Si alloy (Sendust), an Fe—Ni alloy (permalloy), an Fe—(M) alloy, an Fe—Ni—(M) alloy, an FeCo—(M) alloy and a Co—(M) alloy, (M) containing at least one element selected from the group consisting of Si, B, C, P, N, Al, Mo, Ti, Zr, Nb, Hf, Ta and Y.

41. A magnetooptical recording apparatus according to claim 39, wherein said substrate comprises a magnetic material.

42. A magnetooptical recording apparatus according to claim 41, wherein said magnetic material is a ferrite.

43. A core for a magnetooptical recording magnetic head, said core comprising:
    a first substrate;
    a first lamination member formed on the first substrate by laminating a plurality of magnetic thin films with a high permeability and a high saturation magnetic flux density with insulating films sandwiched therebetween;
    a second substrate;
    a second lamination member formed on the second substrate by laminating a plurality of magnetic thin films with a high permeability and a high saturation magnetic flux density with insulating films sandwiched therebetween; and
    a third substrate,
    wherein the thickness of each of said magnetic thin films is at most 10 μm, the thickness of each of said first and second lamination members is at most 100 μm, a surface of said first lamination member is adhered to a surface of said third substrate, and a surface of said second lamination member is adhered to an opposite surface of said third substrate.

44. A core according to claim 43, wherein said magnetic thin films comprise at least one alloy selected from the group consisting of an Fe—Al—Si alloy (Sendust), an Fe—Ni alloy (permalloy), an Fe—(M) alloy, an Fe—Ni—(M) alloy, an FeCo—(M) alloy and a Co—(M) alloy, (M) containing at least one element selected from the group consisting of Si, B, C, P, N, Al, Mo, Ti, Zr, Nb, Hf, Ta and Y.

45. A core according to claim 43, wherein said third substrate comprises a magnetic material.

46. A core according to claim 45, wherein said magnetic material is a ferrite.

47. A core according to claim 43, wherein each of said first and second substrates comprises a non—magnetic material.

48. A core according to claim 47, wherein said non-magnetic material is a ceramic.

49. A magnetooptical recording magnetic head comprising:

a base;

a core provided on said base, said core comprising a first substrate, a first lamination member formed on the first substrate by laminating a plurality of magnetic thin films with a high permeability and a high saturation magnetic flux density with insulating films sandwiched therebetween, a second substrate, a second lamination member formed on the second substrate by laminating a plurality of magnetic thin films with a high permeability and a high saturation magnetic flux density with insulating films sandwiched therebetween and a third substrate, a surface of said first lamination member being adhered to a surface of said third substrate, a surface of said second lamination member being adhered to an opposite surface of said third substrate, the thickness of each of said magnetic thin films being at most 10 μm and the thickness of each of said first and second lamination members being at most 100 μm; and a coil wound around said core.

50. A magnetooptical recording magnetic head according to claim 49, wherein said magnetic thin films comprise at least one alloy selected from the group consisting of an Fe—Al—Si alloy (Sendust), an Fe—Ni alloy (permalloy), an Fe—(M) alloy, and Fe—Ni—(M) alloy, an FeCo—(M) alloy and a Co—(M) alloy, (M) containing at least one element selected from the group consisting of Si, B, C, P, N, Al, Mo, Ti, Zr, Nb, Hf, Ta and Y.

51. A magnetooptical recording magnetic head according to claim 49, wherein said third substrate comprises a magnetic material.

52. A magnetooptical recording magnetic head according to claim 51, wherein said magnetic material is a ferrite.

53. A magnetooptical recording magnetic head according to claim 49, wherein each of said first and second substrates comprises a non-magnetic material.

54. A magnetooptical recording magnetic head according to claim 53, wherein said non-magnetic material is a ceramic.

55. A magnetooptical recording apparatus comprising:

an optical head for irradiating a magnetooptical recording medium, said head comprising a base, a core provided on said base, and a coil wound around said core, wherein said core comprises a first substrate, a first lamination member formed on the first substrate by laminating a plurality of magnetic thin films with a high permeability and a high saturation magnetic flux density with insulating films sandwiched therebetween, a second substrate, a second lamination member formed on the second substrate by laminating a plurality of magnetic thin films with a high permeability and a high saturation magnetic flux density with insulating films sandwiched therebetween, and a third substrate, a surface of said first lamination member being adhered to a surface of said third substrate and a surface of said second lamination member being adhered to an opposite surface of said third substrate, the thickness of each of said magnetic thin films being at most 10 μm and the thickness of each of said first and second lamination members being at most 100 μm.

56. A magnetooptical recording apparatus according to claim 55, wherein said magnetic thin films comprise at least one alloy selected from the group consisting of an Fe—Al—Si alloy (Sendust), an Fe—Ni alloy (permalloy), an Fe—(M) alloy, an Fe—Ni—(M) alloy, an FeCo—(M) alloy and a Co—(M) alloy, (M) containing at least one element selected from the group consisting of Si, B, C, P, N, Al, Mo, Ti, Zr, Nb, Hf, Ta and Y.

57. A magnetooptical recording apparatus according to claim 55, wherein said third substrate comprises a magnetic material.

58. A magnetooptical recording apparatus according to claim 57, wherein said magnetic material is a ferrite.

59. A magnetooptical recording apparatus according to claim 55, wherein each of said first and second substrates comprises a non-magnetic material.

60. A magnetooptical recording apparatus according to claim 59, wherein said non-magnetic material is a ceramic.

* * * * *